(12) United States Patent
Paavola

(10) Patent No.: US 10,760,695 B2
(45) Date of Patent: Sep. 1, 2020

(54) PINCH VALVE

(71) Applicant: Flowrox Oy, Lappeenranta (FI)

(72) Inventor: Esa Paavola, Lappeenranta (FI)

(73) Assignee: Flowrox Oy, Lappeenranta (FI)

( * ) Notice: Subject to any disclaimer, the term of this patent is extended or adjusted under 35 U.S.C. 154(b) by 0 days.

(21) Appl. No.: 16/155,136

(22) Filed: Oct. 9, 2018

(65) Prior Publication Data

US 2019/0107212 A1    Apr. 11, 2019

(30) Foreign Application Priority Data

Oct. 11, 2017   (FI) .................................. 20175891

(51) Int. Cl.
*F16K 7/06*   (2006.01)
*F16K 7/07*   (2006.01)
*F16K 27/04*  (2006.01)

(52) U.S. Cl.
CPC .............. *F16K 7/066* (2013.01); *F16K 7/075* (2013.01); *F16K 27/044* (2013.01)

(58) Field of Classification Search
USPC .......................................................... 251/4, 7
See application file for complete search history.

(56) References Cited

U.S. PATENT DOCUMENTS

| | | | | |
|---|---|---|---|---|
| 261,354 A * | 7/1882 | Johnson | ............... | A61M 39/284 251/9 |
| 2,994,337 A | 8/1961 | Freeman | | |
| 3,598,288 A * | 8/1971 | Posgate | ................... | F16K 7/068 222/644 |
| 3,881,641 A * | 5/1975 | Pliml, Jr. | ............... | A47G 19/18 222/207 |
| 4,044,989 A * | 8/1977 | Basel | ....................... | F16K 7/06 251/7 |
| 4,108,418 A | 8/1978 | Ensign | | |
| 7,641,170 B2 * | 1/2010 | Spray | ...................... | F16K 7/066 251/6 |
| 7,721,921 B2 * | 5/2010 | Ramusch | ............. | B67D 1/1422 222/505 |
| 10,112,820 B1 * | 10/2018 | Smith | .................. | B67D 3/0061 |

(Continued)

FOREIGN PATENT DOCUMENTS

| | | |
|---|---|---|
| CN | 202580106 U | 12/2012 |
| CN | 103968104 A | 8/2014 |
| EP | 0084699 A1 | 8/1983 |

(Continued)

OTHER PUBLICATIONS

Search report of Finnish Patent Application No. 20175891 dated Jan. 9, 2018, 7 pages.

*Primary Examiner* — Daphne M Barry
(74) *Attorney, Agent, or Firm* — Berggren LLP

(57) ABSTRACT

The invention relates to a pinch valve comprising at least a body having connecting flanges, a sleeve made of elastic material and an actuator, wherein said pinch valve comprises first pinching means that is movable towards the sleeve, wherein as a response to an operation of the actuator, said first pinching means squeezes the sleeve at least partially to control a flow in said sleeve. In the pinch valve, the sleeve is curved, and said connecting flanges are not parallel, whereupon said sleeve is fixed to the body in such a manner that openings of said sleeve are not parallel either.

4 Claims, 5 Drawing Sheets

(56) References Cited

U.S. PATENT DOCUMENTS

2006/0016478 A1* 1/2006 Chantalat ............ A61M 39/288
137/223
2010/0200613 A1 8/2010 Smith

FOREIGN PATENT DOCUMENTS

GB 766481 A 1/1957
GB 2166521 A 5/1986

* cited by examiner

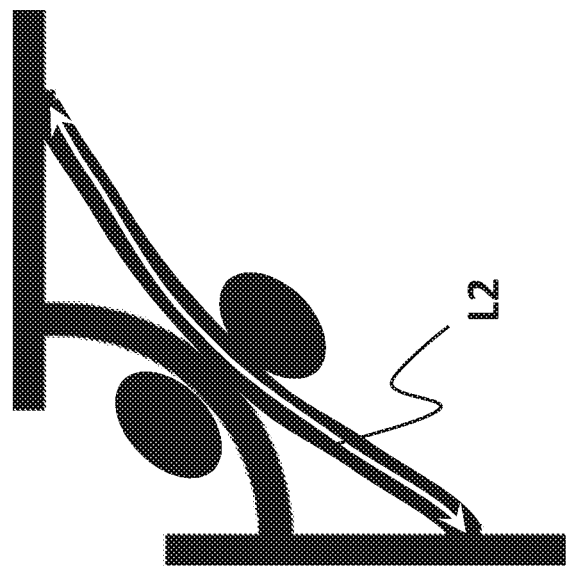
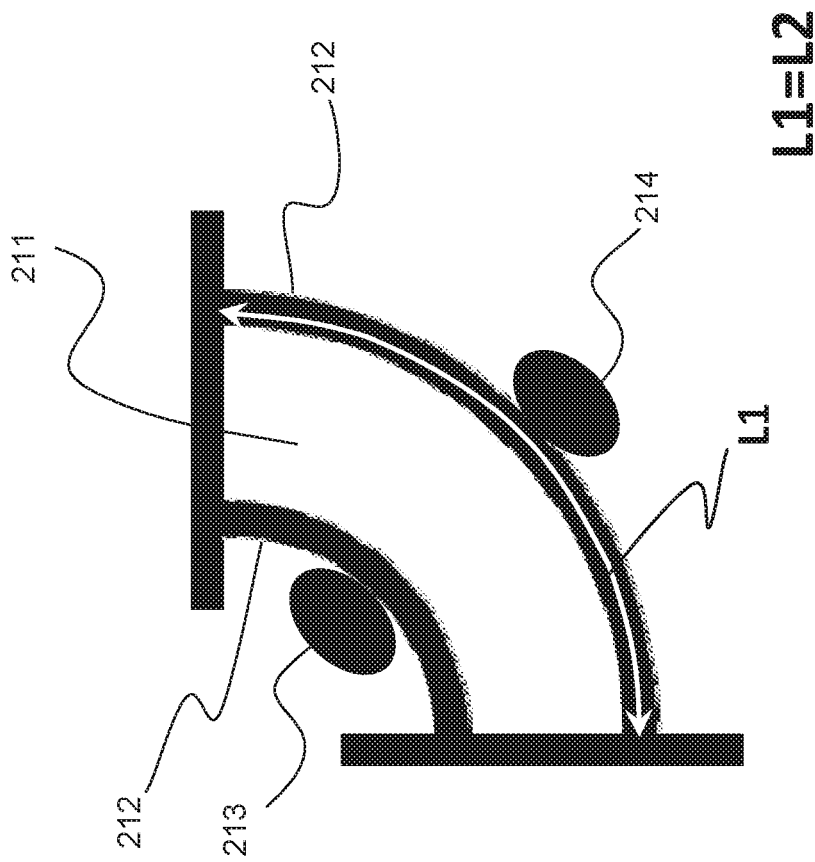
Fig. 2a
Fig. 2b
L1=L2

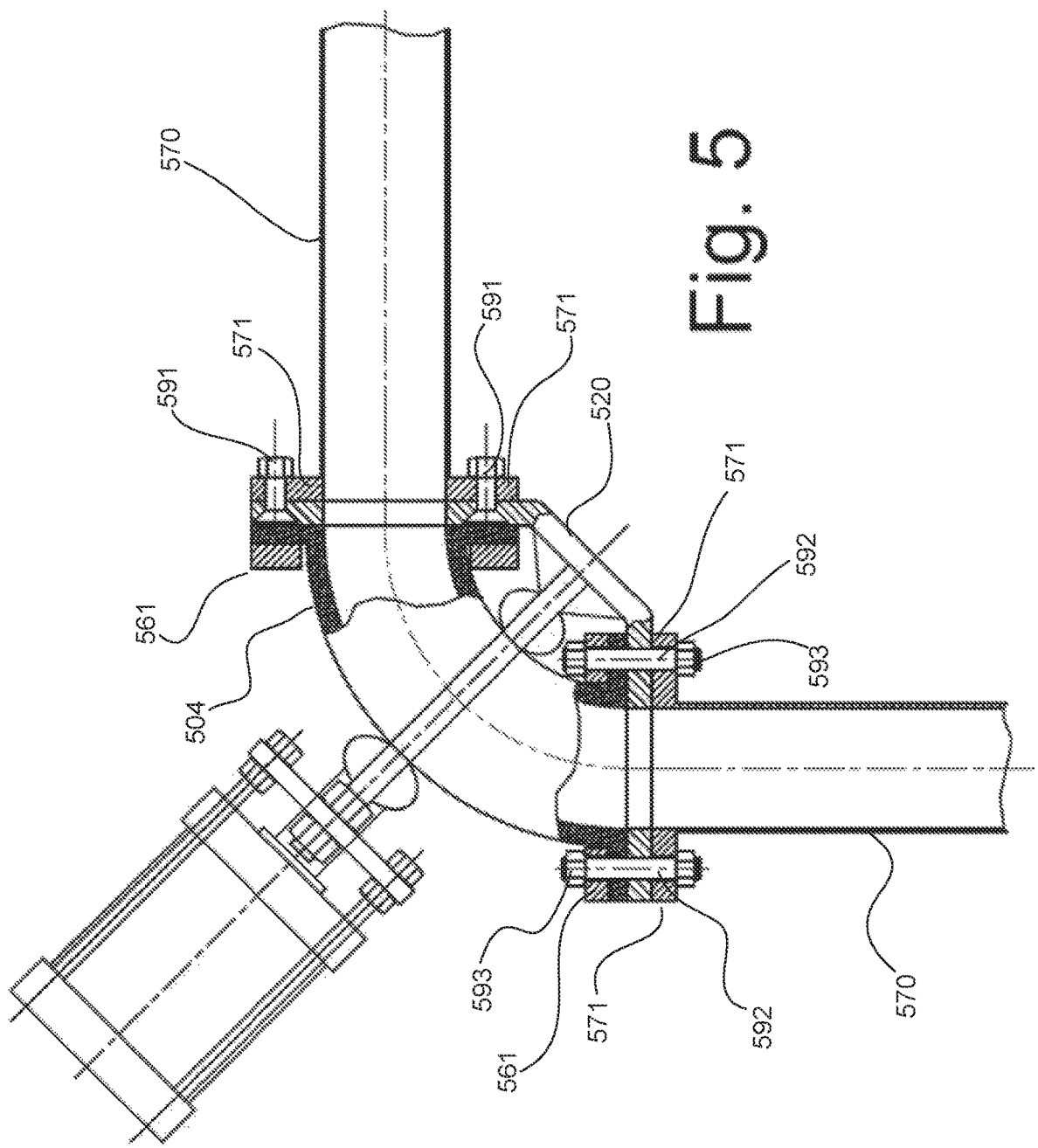

PINCH VALVE

PRIORITY

This application claims priority of Finnish national patent application number 2017589, filed on Oct. 11, 2017, the content of which is incorporated herein by reference.

TECHNICAL FIELD

The present solution relates to valves, particularly to pinch valves.

BACKGROUND

Valves are used in various industrial processes for controlling the flow of gases, liquids, slurries by partially or completely opening; or partially or completely closing the passageway of the flow. Valves can be located in pipelines, piping systems, hose systems etc.

An example of one of the valve types is a pinch valve, which is configured to regulate the flow by closing the passageway of the flow through pinching activity. Pinch valves can be used for example in demanding industrial shut-off and control application, e.g. abrasive and corrosive mediums, tank isolation, thickeners, pump isolation, process pipelines, etc.

Pinch valves comprise a body, an actuator and a sleeve, wherein said sleeve forms the passageway for the flow. In operation, the sleeve is squeezed outside the sleeve either completely causing the shut-off of the flow (on/off valve) or partially to control the flow (control valve). During pinching the sleeve is stretched extensively, whereby the durability of the sleeve is weakened.

SUMMARY

Now there has been invented an improved pinch valve by means of which the stretching of a sleeve can be minimized. The pinch valve is characterized by what is stated in the independent claims. Various embodiments of the invention are disclosed in the dependent claims.

According to a first aspect of the invention, a pinch valve comprises at least a body having connecting flanges, a sleeve made of elastic material, and an actuator. The pinch valve also comprises first pinching means that is movable towards the sleeve, wherein as a response to an operation of the actuator, said first pinching means squeezes the sleeve at least partially to control a flow in said sleeve, wherein the sleeve is curved, and wherein said connecting flanges are not parallel in said pinch valve, whereupon said sleeve is fixed to the body in such a manner that openings of said sleeve are not parallel either.

According to an embodiment, the pinch valve further comprises second pinching means on opposite side of the sleeve than the first pinching means, wherein said second pinching means is stationary, and wherein said first pinching means is configured to squeeze the sleeve against said second pinching means.

According to an embodiment, a part of the body on opposite side of the sleeve than the first pinching means acts as a stationary counterpart for the first pinching means.

According to an embodiment, said sleeve is replaceable.

According to an embodiment, said pinch valve is permanently fixed to a pipeline.

BRIEF DESCRIPTION OF THE DRAWINGS

In the following, various embodiments of the invention will be described in more detail with reference to the appended drawings, in which

FIGS. 2a-2b illustrate a basic principle of the pinch valve according to the invention;

FIG. 5 illustrates in a simplified manner integration of the body and the sleeve of the pinch valve to a pipeline.

DETAILED DESCRIPTION

Pinch valves are known in the technical field of valves. As discussed in the background portion of this description, a pinch valve comprises a body, a sleeve made of an elastic material, and an actuator. The body can be enclosed or open. An enclosed body prevents straight slurry leakage to the environment when sleeve gets broken. It also prevents premature sleeve deterioration by protecting the sleeve from the environment and sunlight. Enclosed body valves can be manufactured of cast iron, fabricated carbon steel, stainless steel, aluminium or plastic. Other materials can be used as well. Valve with an open body may be used for non-hazardous media, lower pressures and operating temperatures. If body and flanges are not connected firmly to each other, the design isolates vibration and tolerates minor misalignments of the pipeline. A valve with open body is also light-weight and easy to service, and it enables monitoring of the sleeve condition and valve opening.

The sleeve of the valve acts as a passageway for the flow, and isolates the flow from the environment. The openings of the sleeve can be connected to the openings of the piping system by means of flanges, so that the flow is able to pass the valve. Sleeves may have constant wall thickness and opening diameter but they can be found in different designs as well. For example, conical sleeves may be used in control valves, a vacuum resistant sleeve may be used in negative pressure applications, sensor-equipped sleeves can be used for detecting and signalling critical wear, polyurethane lined sleeve can be used for improved protection against wear. Sleeve material may be selected from wide variety of elastomers, typically from different rubbers like: styrene butadiene, ethylene propylene, natural rubber, nitrile, or butyl. Other elastic materials for the sleeve are also possible.

The pinch valve comprises a mechanism that obstructs or blocks the flow in the sleeve. The mechanism can be implemented as a bar or as a clip or as other means that squeezes (automatically or manually) the sleeve to partially or totally close the passageway of the flow.

Manual valves may comprise a handwheel actuator with or without a reduction gear. Automatic valves may comprise a pneumatic actuator, a hydraulic actuator, or an electric actuator. Some automatic valves may comprise special types of actuators, e.g. hydraulic actuator with a power unit, pneumatic motor driven actuators, or water-hydraulic actuators.

Figure 1A:
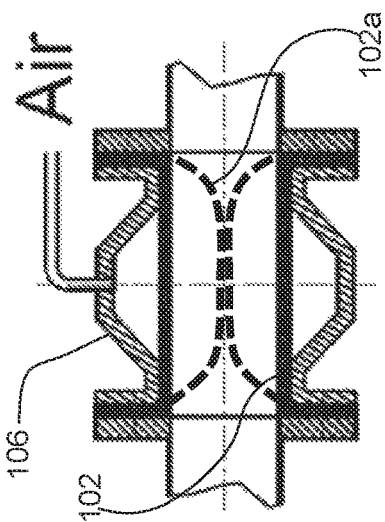
FIGS. 1a-1c illustrate examples of known pinch valves.
Figure 1B:
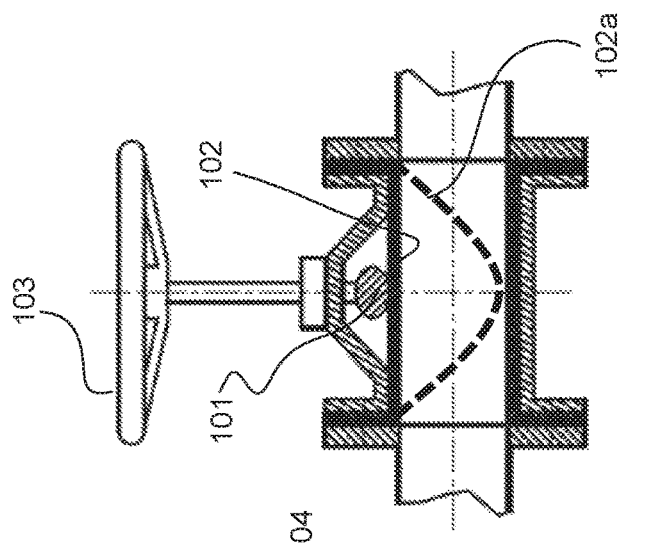
Figure 1C:
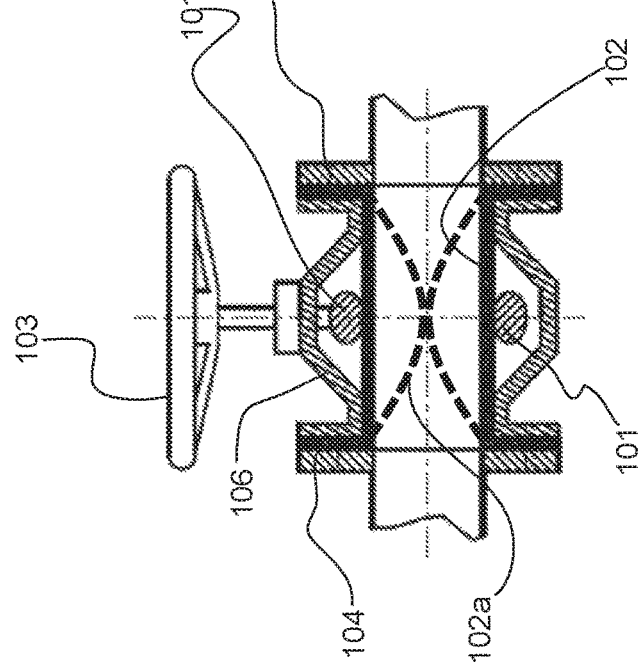

Examples of known pinch valves are shown in FIG. 1a-1c.

FIG. 1a shows a pinch valve having two pinch bars 101. The body 106 of the pinch valve can be open or closed. The pinch valve also comprises a pre-installed sleeve 102 with flanges 104. By means of the flanges 104, the pinch valve can be positioned in any piping system or hose system to be part of it. The pinch bars 101 are configured to press the sleeve 102 on both sides by means of an actuator, which is this example is a handwheel 103. In use, the valve can be shut by manually rotating the handwheel 103, which causes the pinch bars 101 to move towards each other. This causes the sleeve 102 to stretch along the movement of the pinch bars 101, wherein opposite parts of the sleeve also stretch towards each other as illustrated schematically with dotted lines 102a in FIG. 1a. Depending on the situation, passageway of the sleeve 102 can be completely closed by pinching the pinch bars 101 together, or the passageway of the sleeve 102 can be partially closed in order to regulate the amount of the flow 110 by keeping the pinch bars 101 slightly apart.

FIG. 1b shows another example of a pinch valve according to the related technology. The only difference of the pinch valve of FIG. 1b compared to FIG. 1a, is that the pinch valve has only one pinch bar 101 so that the pinching occurs only on one side of the sleeve, as illustrated with dotted line 102a in FIG. 1b. The operation of the valve of FIG. 1b is otherwise the same as with the valve of FIG. 1a. The benefits of a pinch valve of FIG. 1b compared to pinch valve of FIG. 1a is that it has a simpler structure. However, since the press is affected only on one side of the sleeve, that part of the sleeve becomes under an excessive stress, which affects to the durability of the sleeve.

FIG. 1c shows yet another example of the pinch valve, where mechanical press generated by the pinch bars have been replaced an air pressure, which is able to control the closing of the sleeve, as illustrated with dotted lines 102a in FIG. 1c. The pinch valve of FIG. 1c is suitable for low pressure applications. This type of pinch valve is used as on/off-valve as exact control of sleeve opening is not possible.

In FIGS. 1a and 1b the actuator is a handwheel 103 which can be operated manually for closing and opening the valve. However, it is appreciated that the handwheel 103 may be replaced with an automatic actuator, for example a pneumatic unit, a hydraulic unit or an electric unit or their combination. In some cases, the actuator may contain both an automatic actuator and a manual actuator, e.g. the handwheel.

As mentioned, the pinch valves shown in FIGS. 1a and 1b have drawbacks, which either affects to the structure of the valve, or to the durability of the sleeve. Therefore, the aim of the present solution is to provide a pinch valve which has a simple structure with only one moving pinching bar, but which stretches the sleeve less than, for example, the pinch valve of FIG. 1b, and thus improves the durability of the sleeve. In fact, the experimental results have shown that the sleeve of the pinch valve according to this invention, endures much longer than the sleeve of the pinch valve of FIG. 1b.

In order to achieve the aim, the present solution provides a curved valve, that is placed into a curve of a piping system (i.e. pipeline) or a hose system. Since the piping system always requires curved pipe parts for the corners of the system, the present invention makes it possible to combine the curved part and the valve.

The basic principle of the present solution is shown in FIGS. 2a and 2b. Passageway of the sleeve is referred to with a reference number 211. Opposite walls of the sleeve are referred to with a shared reference number 212, since the wall is continuous around the passageway 211. Pinch bars are illustrated with reference numbers 213, 214, where an inner pinch bar 213 is stationary, i.e. not moving, and where an outer pinch bar 214 is configured to be moved towards and outward the inner pinch bar 213 thus closing or opening the passageway 211. FIG. 2a shows the situation where the outer pinch bar 214 is in an open position and the passageway 211 is also open, whereas FIG. 2b shows the situation where the outer pinch bar 214 is in a closed position, and the passageway 211 is closed. What should be noticed from FIGS. 2a and 2b, is that the length of the sleeve is not stretched between these two operating positions (i.e. opened and closed). The length L1 of the sleeve in the opened position (FIG. 2a) is the same as the length L2 of the sleeve in the closed position (FIG. 2b).

Figure 3:
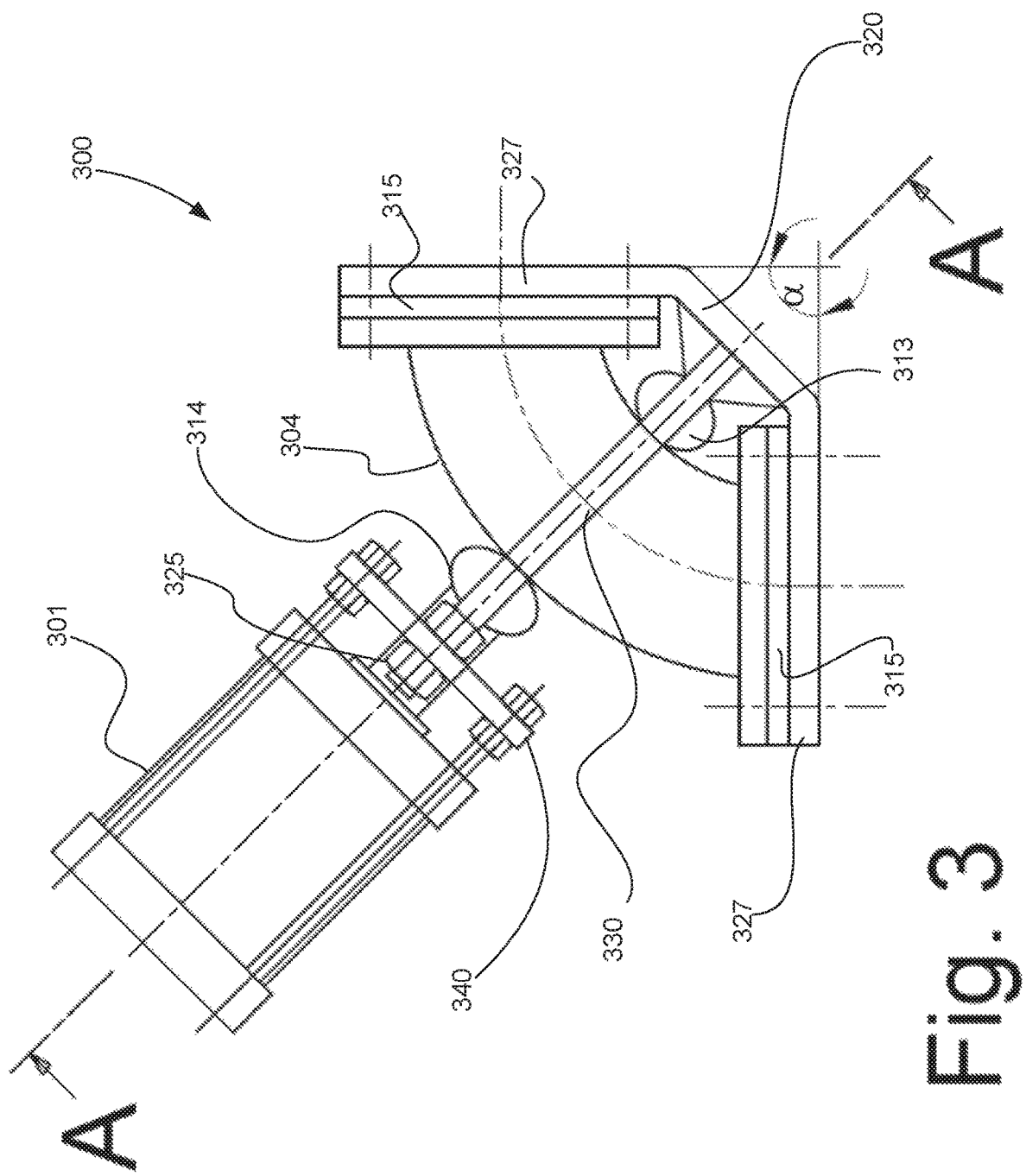
FIG. 3 illustrates a pinch valve according to an embodiment of the present invention.

FIGS. 3-5 illustrate a curved valve according to embodiments of the invention. The illustrations are made in a simplified manner, with elements that are needed for a specific embodiment. In addition, the valves shown in Figures do not demonstrate the actual size of the valve. The dimensions of the valve and their proportions may vary greatly from what has been shown in the Figures. Each of the embodiment shown in FIGS. 3-5 may contain known elements and materials as discussed with reference to FIGS. 1a-c, except the curved design of the valve and the sleeve, which is special for the present solution.

As shown in FIG. 3, the valve 300 has a rigid body 320, a sleeve 304 made of elastic material, and an actuator 301, which can be connected by means of opposite stems 330 (only one stem 330 shown in FIG. 3, the other one is situated on the other side of the sleeve 304) to the valve body 320. The actuator 301 can be a manual actuator or an automatic actuator, or their combination. The rigid body 320 has two connecting flanges 327 by means of which the valve can be connected to the piping system.

Pinch valves of the related technology are straight (see FIGS. 1a-1c) which means that flow passageway is straight and ends of the valve are parallel, as well as corresponding connecting flanges of pipeline. The pinch valve according to the present invention is not straight but curved in the sense that the connecting flanges 327 of the pinch valve are not parallel with respect to each other, but form an angle α, for example 90°. The amount of the angle may vary according to the piping system's structure, and may be 180°-45°±10°. Since the connecting flanges 327 are not parallel, the sleeve 304 being connected to them needs to be curved, whereupon the openings 315 of the sleeve 304 are neither parallel with respect to each other.

The valve 300 also comprises a first pinch bar, i.e. an outer pinch bar 314 that is movable, and a second pinch bar, i.e. an inner pinch bar 313 that is stationary. Term "pinch bar" refers to pinching means of a certain design. However, it is appreciated that the pinching means does not necessarily have to be in the form of "bar", but of any form by means of which a pinching action according to the present invention can be achieved. Valve body 320 can be designed so that the stationary inner pinch bar 313 is rigid part of the valve body 320, i.e. the part of the body 320 that is counterpart of the outer pinch bar. The pinch bars 313, 314 may have a planar or curved surface, and the material of the pinch bars 313, 314 may be steel, aluminium, plastic or any other suitable material. The pinch bars 313, 314 may be connected to the stems 330 so that one end of the pinch bar is connected to one of the stems, and the other end of the pinch bar is connected to the other stem. Inner pinch bar 313 is fixed to the stems 330 and outer movable pinch bar 314 uses stems 330 for guidance only. The inner pinch bar 313 locates outside the inner curve of the sleeve 304, whereas the outer pinch bar 314 locates outside the outer curve of the sleeve 304, the outer curve having a length greater than the length of the inner curve. The sleeve is placed in the valve's structure between the stems 330 and between the pinch bars 313, 314.

Supporting plate 340 is fixed tightly to both stems 330, and an actuator 301, a pneumatic cylinder in this example, is fixed to the supporting plate 340. Actuator rod 325 goes through a hole in the supporting plate 340 and is fixed to the outer pinch bar 314.

Figure 4B:
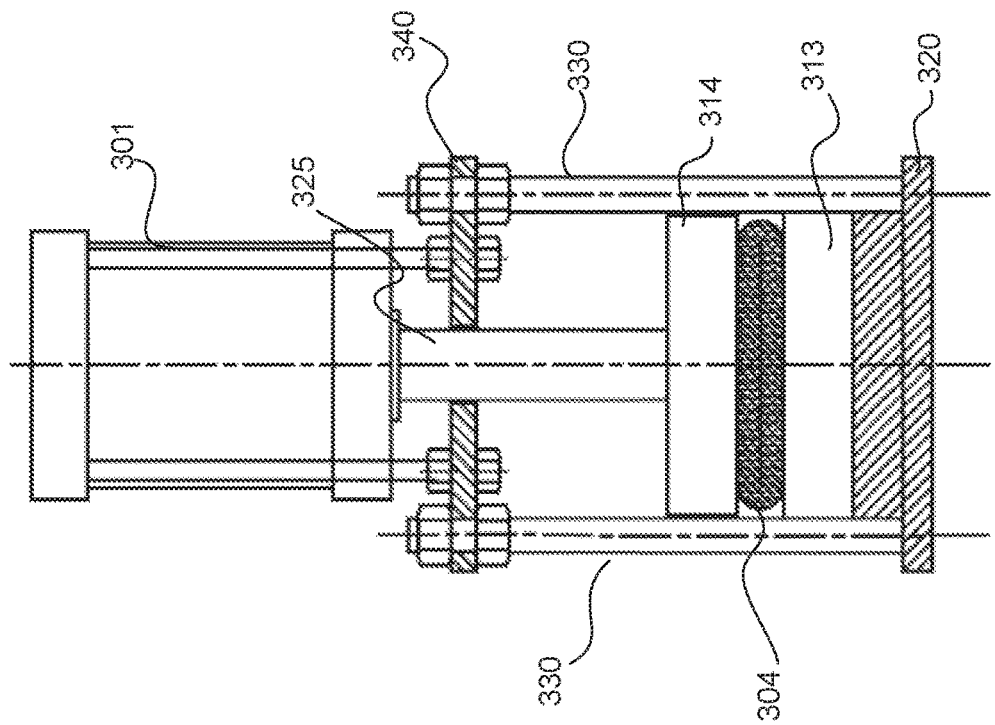
FIGS. 4a-4b illustrates a cross-section of the pinch valve during operation of the pinch valve.
Figure 4A:
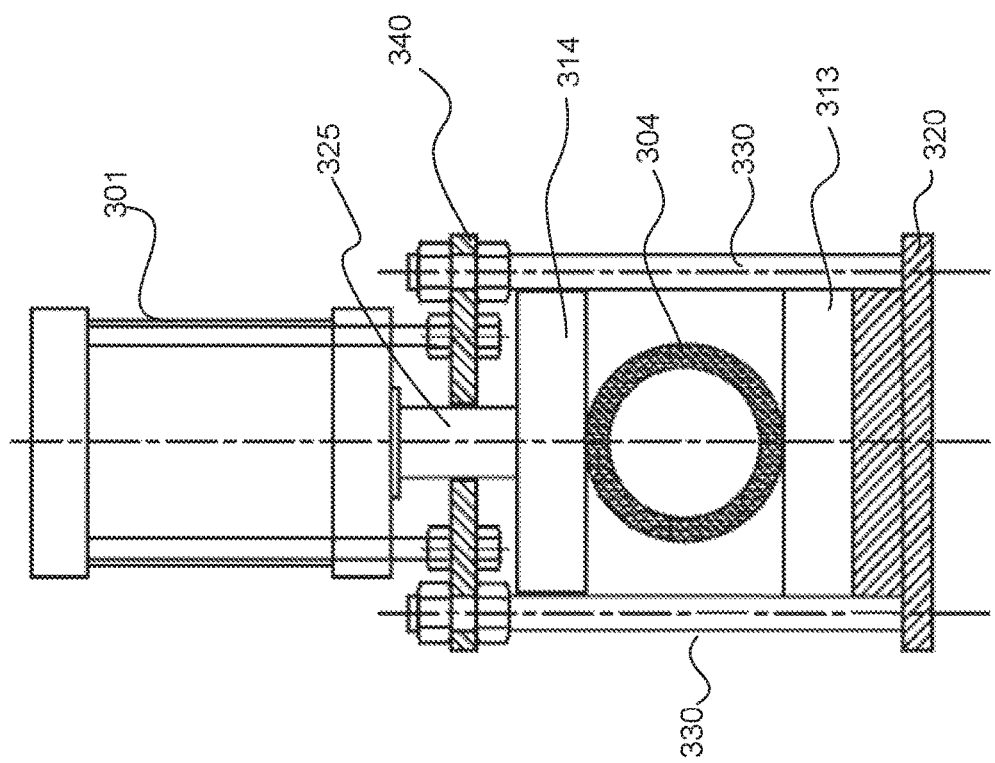

FIGS. 4a and 4b show a cross-section A-A of the curved valve of FIG. 3 in a simplified manner. The reference numbers used in FIGS. 4a, 4b correspond those of FIG. 3, which means that the same elements of FIGS. 4a, 4b are referred to with same reference numbers as in FIG. 3. It is to be noticed that FIG. 4a illustrates the valve in an open position, and FIG. 4b illustrates the valve in a closed position. It is worth noticing that only element that moves when the valve is closed is the outer pinch bar 314. The inner pinch bar 313 keeps its position, as well as the supporting plate 340 and actuator 301.

FIG. 5 is a stripped-down illustration of the sleeve 504 being connected to the valve body 520. FIG. 5 shows that the sleeve 504 can be connected to the valve body 520 by means of flanges 561. A flange 561 may be continuously circular. Alternatively, a flange 561 may be composed of two half-circular parts, which may ease the assembling. As shown in FIG. 5, the connecting of the valve body 520 to the piping system 570 can be done permanently. This makes it easier to replace the sleeve 504 of the curved valve without a need to remove the valve body 520. By this, the valve body 520 supports the pipe ends of the piping system during maintenance. The valve body 520 can be fixed to the piping system 570 in different ways. If the valve body 520 is desired to be kept in its place while the sleeve is being replaced, the fixing can be implemented for example by using two additional special screws 591 having a conical part. These screws 591 can be used to fix valve to two extra bolt holes or threated holes in the pipeline flange 571. It is also possible to replace two conventional bolt holes of valve body by threaded holes and use threaded rods 592 and nuts 593 to fix valve 520 to pipeline flange 571. Instead of special screws and bolts, all the bolts can be conventional bolts as well, if the whole valve is taken out of the pipeline for sleeve replacement. By understanding these different variations of the fixing mechanisms, it is appreciated that the present solution is not limited to any particular mechanism.

The present solution provides advantages. For example, the closing of the flow passageway within a sleeve occurs on one side of the sleeve only, which makes the structure of the valve simple and rigid. In addition, the sleeve is not stretched, wherein the durability of the sleeve is greatly improved. The sleeve can also be easily replaced as there is no need to remove the whole valve body for the sleeve replacement. In addition, the valve is suitable to be placed into vertical and horizontal curves.

Industrial processes contain lots of pipelines having curves and valves. One advantage of this invention is to combine separate pipe curve and separate valve to one simple unit. In many cases, especially in mining industry, abrasive slurry causes severe wearing of pipeline curves and valve according to this invention offers wear resistant alternative for pipeline curves.

In previous, a pinch valve according to the present invention has been discussed by using open valve body as an example. It is appreciated that the pinch valve based on curved sleeve can be constructed with enclosed valve body as well. In that case the valve can be operated with no moving parts outside valve body which increases safety.

It is noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A pinch valve comprising:
    a body having two non parallel connecting flanges;
    a curved elastic sleeve having a passage way, two open ends, an inner curve, and
  an outer curve, and being fixed from the open ends between the two non parallel connecting flanges such that the open ends are non parallel and a full length of the outer curve and a full length of the inner curve are curved to a single direction;
    a first pinching means on the outer curve of the sleeve;
    a second pinching means being stationary and located opposite to the first pinching means on the inner curve of the sleeve;
  wherein the first pinching means is movable toward the second pinching means and configured to close the passage way when moved against the second pinching means by straightening full length of the outer curve between the flanges without changing length of the outer curve; and
    an actuator configured to operate the valve.
2. The pinch valve according to claim 1, wherein said sleeve is replaceable.
3. The pinch valve according to claim 1, wherein said pinch valve is permanently fixed to a pipeline.
4. The pinch valve of claim 1, wherein the first and the second pinching means are pinch bars.

* * * * *